INVENTOR
Warren J. Schmidt

BY Arnold Roylance & Harris

ATTORNEYS

INVENTOR
Warren J. Schmidt
BY
Arnold, Roylance & Harris
ATTORNEYS

United States Patent Office 3,350,699

Patented Oct. 31, 1967

3,350,699
AUTOMATIC POSITIONING APPARATUS UTILIZING MAGNETIC RECORDING MEANS

Warren J. Schmidt, Rockville, Md., assignor, by mesne assignments, to American Machine & Foundry Company, New York, N.Y., a corporation of New Jersey Filed Nov. 8, 1963, Ser. No. 322,457
4 Claims. (Cl. 340—174.1)

ABSTRACT OF THE DISCLOSURE

In this invention, either a spinning transducer or a plurality of transducers is employed to record binary data information.

This invention relates to automatic positioning apparatus, and more particularly to apparatus for recording position data as well as binary data control instructions, on a recording medium, and for utilizing the previously recorded data to position a movable member accordingly.

Automatic positioning apparatus is currently used extensively on automatic industrial machinery to position machine tools and the like in accordance with a pre-recorded program. In the past, control has usually been achieved numerically by systems which are either of the absolute type, where the recorded numerical data designates particular successive desired positions, or of the incremental type, where the recorded numerical data designates the number of incremental spaces to travel in order to reach successive desired locations. These prior systems have proved effective in many installations, but are relatively expensive, difficult to construct and difficult to maintain.

In copending application Serial Number 245,294, filed December 16, 1962, by Warren J. Schmidt et al., now U.S. Patent No. 3,241,021, an entirely new system is set forth which is a complete departure from the earlier incremental and absolute systems. In this new system, a magnetic transducer and associated magnetic recording medium are coupled to the movable member so that the position of the transducer with respect to the recording medium is always a function of the movable member position. When the transducer is energized, a magnetic position mark is recorded on the recording medium at a location representative of the then existing movable member position. During the subsequent playback operation, the movable member is set in motion and continues to travel until a previously recorded position mark is detected, indicating that the movable member again occupies the position it had previously occupied when the position mark was recorded. By recording a plurality of these position marks, the movable member can automatically be controlled to travel from point to point tracing the locus of a desired curve.

It is an object of this invention to provide a further improved system of this new type overcoming the disadvantages of earlier absolute and incremental control systems.

Another object of this invention is to provide a system of the type described where the recording space available on the recording medium is more effectively utilized.

Still another object is to provide a system of the type described which records binary data instructions in addition to position marks, and which is operable to automatically reposition a movable member in accordance with the pre-recorded position and binary data.

Yet another object is to provide a system of the type described wherein transducers responsive to changes in magnetic flux are employed to thereby eliminate the need for more expensive and less reliable flux responsive transducers.

The manner in which these and other objects are attained in accordance with this invention is illustrated in greater detail in the following specification and drawings, which drawings form a portion of this specification, and wherein.

Figures 1, 5:
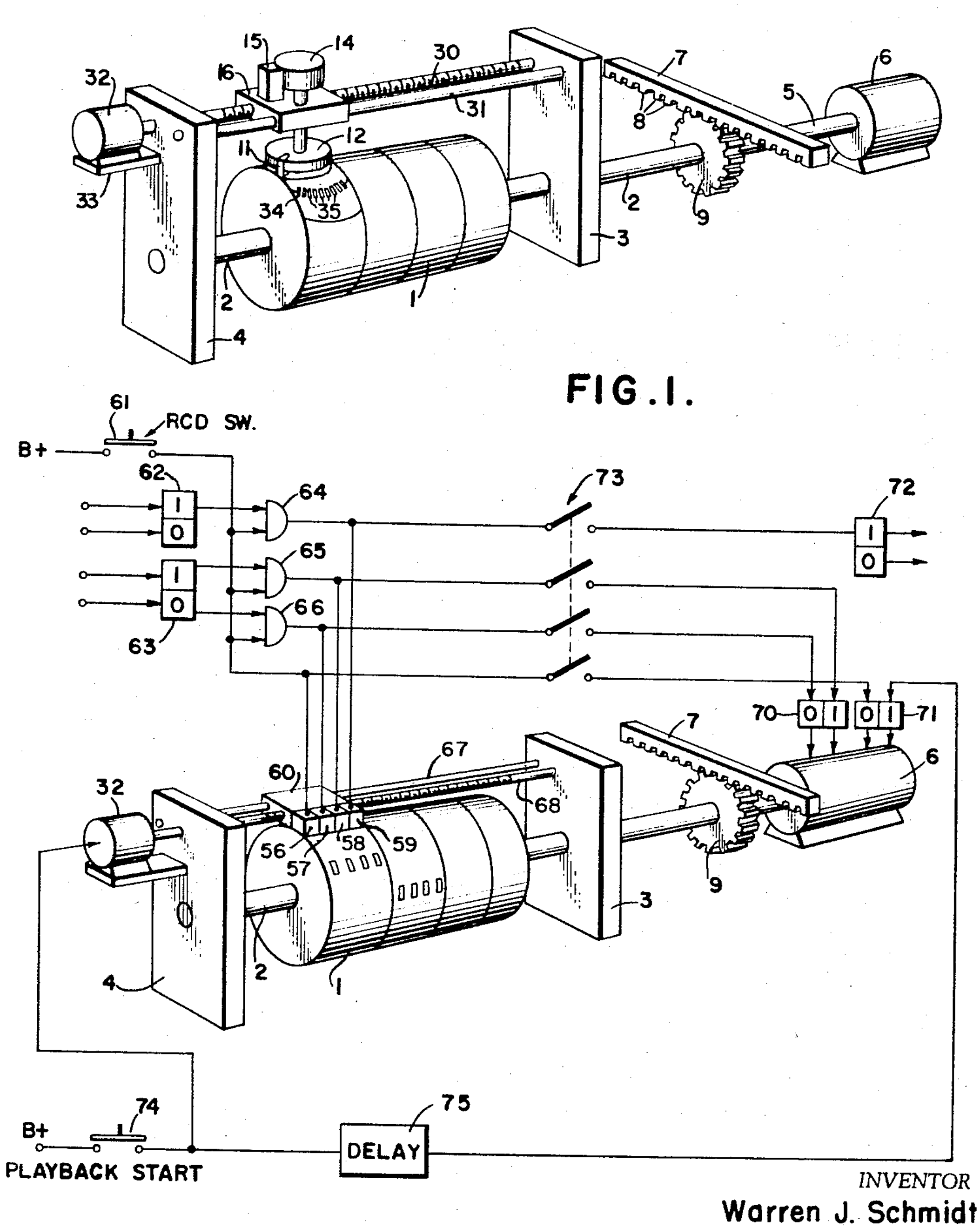
FIG. 1 is a perspective view illustrating memory apparatus in accordance with one embodiment of the invention.
FIG. 5 is a perspective view illustrating memory apparatus in accordance with another embodiment of this invention along with the associated electrical control apparatus shown schematically.

The memory apparatus illustrated in FIG. 1 includes a cylindrical memory drum 1, which is preferably constructed from aluminum or other non-magnetic material. The circumferential surface of the memory drum is coated with a suitable magnetizable material, such as iron oxide. The memory drum is mounted on a shaft 2 which is journaled in suitable end supports 3 and 4. Shaft 2 extends beyond end support 3 and is rigidly secured to a shaft 5 of a bidirectional electrical driving motor 6.

An enlongated rack member 7 is illustrative of a movable member being positioned and includes teeth 8 along the lower surface thereof which mesh with teeth of a pinion gear 9. The pinion gear is rigidly secured to shaft 2. Because of the coupling between the movable member and the memory drum via pinion gear 9, the position of the memory drum is always a function of the movable member position. The movable member need not be a rack member as shown, but could, for example, be a member which is rotated and positioned angularly, or a member which is remotely located from shaft 2 and positioned by means of suitable chain or pulley drives or other suitable mechanical or electrical linkages.

Figures 2, 3:
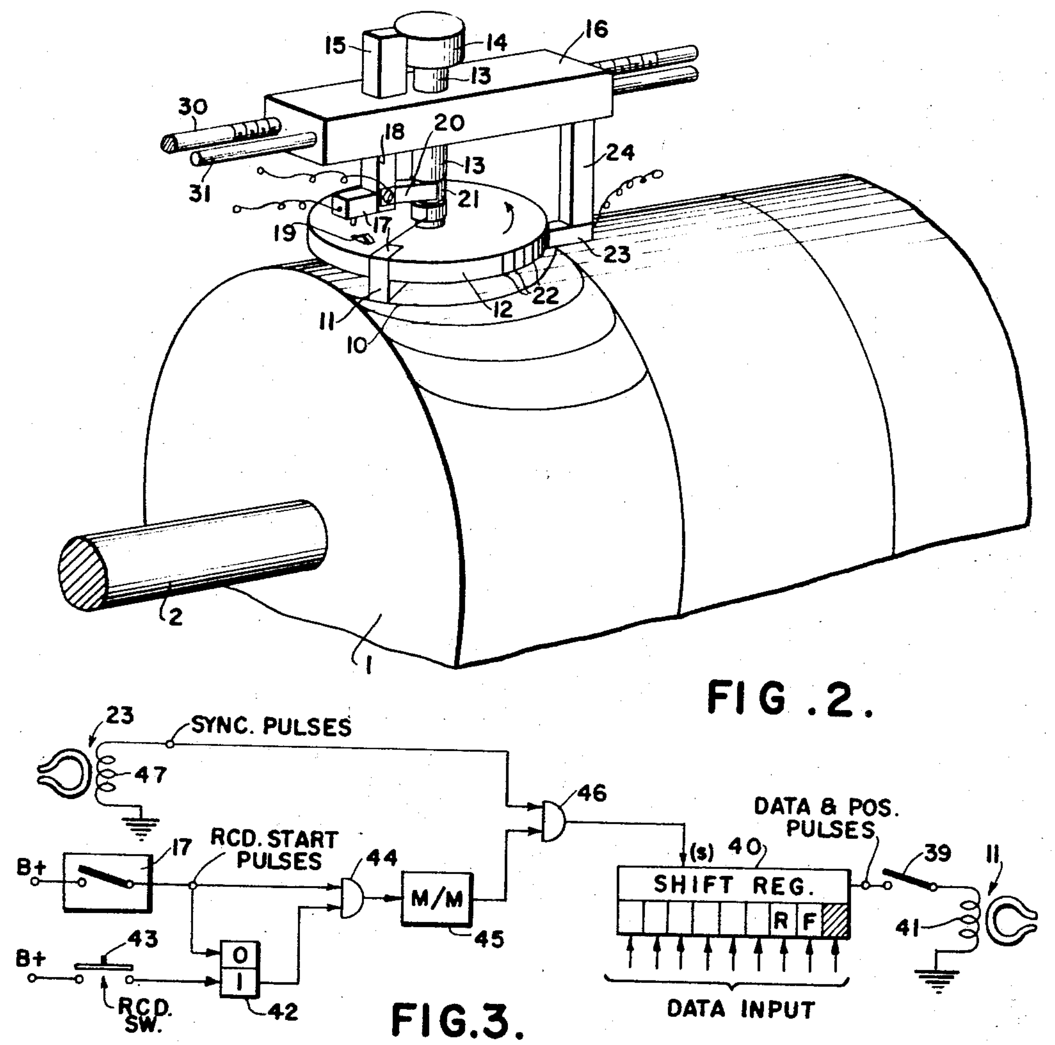
FIG. 2 is an enlarged perspective view of the transducer and associated apparatus for the embodiment illustrated in FIG. 1.
FIG. 3 is a schematic diagram illustrating the recording circuits associated with the memory apparatus illustrated in FIG. 1.

The magnetic transducer for recording magnetic marks on the memory drum is best seen in FIG. 2. This transducer 11 is a conventional magnetic read-write head comprising a core of magnetic material having an air gap disposed adjacent the magnetizable surface of the recording medium, and a winding surrounding a portion of the core. When the winding is energized, a magnetic field is created across the air gap which records a magnetic mark on the magnetizable recording surface. When the transducer passes over a previously recorded magnetic mark, changes of magnetic flux are induced in the core, thereby providing an electrical pulse signal in the winding.

Transducer 11 is mounted in a suitable slot disposed at the periphery of a disc 12 constructed of aluminum or other nonmagnetic material. The transducer is mounted so that the transducer core extends below the disc (as viewed in FIG. 2), and so that the air gap of the core is disposed as close to the magnetizable surface as possible. The transducer is adapted to move continuously, following an endless path so that the transducer, for at least a portion of the path, travels substantially parallel to the recording surface. The disc lies in a plane which is tangential to the memory drum surface, and is positioned so that the periphery of the disc, at one point, is substantially at the point of tangency. Accordingly, an arcuate segment of the disc periphery is substantially parallel to the drum surface at the point of tangency, and therefore the transducer traces an arcuate path, such as arcuate path 10, across the memory drum's surface when the disc is rotated.

Disc 12 is securely fastened to one end of a shaft 13 which is journaled in the center of a positioning member 16 and secured, at the other end, to the shaft of an electric motor 14. The electric motor is secured to positioning member 16 by a suitable support member 15 and is operable to rotate disc 12 at a constant speed.

A microswitch 17 is positioned slightly above disc 12 and maintained in position by means of a support member 18 suitably secured to positioning member 16. The activating plunger of the microswitch cooperates with a cam surface 19 on the disc so that the microswitch is actuated momentarily once per revolution of the disc when the disc is at a predetermined position. Support member 18 also supports a resilient member 20 which cooperates with a slip ring 21 secured to shaft 13. One end of the winding of transducer 11 is connected to ground via disc 12, shaft 13, and positioning member 16, while the other end of the winding is connected to slip ring 21. Thus, as will be explained hereinafter in greater detail, data and position pulses can be supplied to the transducer to selectively energize the same and record corresponding position and data marks on the memory drum. Also, the electrical pulses provided by the transducer, when the previously recorded magnetic marks are detected, flow to the playback circuit by means of the slip ring arrangement.

A portion of the periphery of disc 12 is coated with a magnetizable medium, such as iron oxide, and a number of equally spaced magnetic marks 22 are recorded thereon. A conventional magnetic transducer 23, capable of detecting magnetic marks 22, is mounted adjacent the periphery of disc 12 by means of a support member 24 secured to positioning member 16. Transducer 23 provides a train of corresponding SYNC pulses which are used to synchronize the recording and retrieving of data on the memory drum.

Positioning member 16 is supported by a threaded positioning shaft 30 and a slide bar 31 passing through the positioning member perpendicular to shaft 12. The threaded shaft is adapted to pass through an internally threaded bore passing lengthwise through the positioning member on one side of shaft 13, so that a positioning block moves longitudinally as the threaded shaft is rotated. Slide bar 31 passes through a suitable smooth bore on the other side of shaft 13 and prevents rotation of the positioning member about the threaded shaft. Slide bar 31 is secured at its ends between end supports 3 and 4, and threaded shaft 30 is journaled in end supports 3 and 4 so that it passes through end support 4 to connect to the shaft of an indexing motor 32. The indexing motor is secured to end support 4 by a support member 33. The indexing motor is of the type which, when energized by suitable electrical pulse, makes one complete revolution and then stops.

The circumferential surface of the memory drum is divided into any desired number of recording tracks, four such recording tracks being shown in FIG. 1, each surrounding the drum. Magnetic marks, such as marks 34 and 35, can be recorded along an arcuate segment of the path traced by transducer 11 when rotated by disc 12. The arcuate segment is in a generally longitudinal direction with respect to the drum and is transverse with respect to a recording track. The position on the drum of the arcuate segment in which magnetic marks can be recorded is determined by the then existing position of the drum. The width of a recording track is determined by the number of magnetic marks to be recorded along an arcuate segment and by the space required for recording each individual magnetic mark. The pitch of the threads of threaded shaft 30 is selected so that positioning member 16 moves a distance corresponding to the width of a recording track when the indexing motor makes one complete revolution.

The recording circuits connected to transducers 11 and 23, and to microswitch 17, are shown in FIG. 3 and include a conventional nine-stage shift register 40. The output of the shift register is connected to one end of a winding 41 of transducer 11 via a switch 39, and the other end of the transducer winding is connected to ground. Each stage of the shift register is bistable and can be placed in either the "1" state or the "0" state by applying appropriate signals to the input of these stages. When a shift pulse is applied to the shift input (S), the data in the shift register is moved one stage to the right, and a pulse emerges from the shift register to energize winding 41 if the stage furthest to the right is in the "1" state when the shift pulse is applied. Therefore, if nine successive shift pulses are applied, all of the binary data is shifted out of the shift register and appears as a corresponding pulse train applied to winding 41, the number of pulses and the time sequence thereof depending on which stages of the shift register were initially in the "1" state.

The recording circuits also include a flip-flop circuit 42 having two stable states which are referred to as the set or "1" state and the reset or "0" state. A push button record switch 43 is connected between a source of positive potential and the set input of flip-flop circuit 42. The contacts of microswitch 17 are connected between the positive source of potential and the reset input of flip-flop circuit 42. Contacts of switch 17 are also connected to one input of an AND circuit 44, the set output of flip-flop circuit 42 being connected to the other input of AND circuit 44. The output of AND circuit 44 is connected to a monostable multivibrator circuit 45.

When record switch 43 is actuated, flip-flop circuit 42 is placed in the set state, which provides a potential on one input of AND circuit 44 via the set output of flip-flop circuit 42. Thereafter, when the contacts of microswitch 17 are closed, the other input of AND circuit 44 is energized and therefore the AND circuit provides an output pulse to monostable multivibrator circuit 45. Actuation of the microswitch also applies a potential to the reset input of the flip-flop circuit 42 which returns the flip-flop circuit to the reset state. However, the inherent time lag, during which the flip-flop circuit changes to the reset state, is sufficient to permit a pulse to have first passed through AND circuit 44 to energize monostable multivibrator circuit 45.

When actuated, monostable multivibrator circuit 45 provides an output pulse of a predetermined time duration to the input of AND circuit 46, thereby conditioning this AND circuit so that pulses applied to the other input can pass through. One end of winding 47 of transducer 23 is connected to ground and the other end is connected to the other input of AND circuit 46. Since shift register 40 has nine stages, nine magnetic marks 22 are recorded on the periphery of disc 12 so that winding 47 will provide nine individual pulses during each revolution of the disc. The time constant of monostable multivibrator circuit 45 is selected so that AND circuit 46 is conditioned sufficiently long to permit a group of nine pulses to pass through the AND circuit to the shift input (S) of shift register 40 connected to the output of AND circuit 46.

In recording a program on memory drum 1, movable member 7 is first moved to a position which is to be recorded, thereby automatically positioning the memory drum so that the magnetic marks will be recorded at a location representative of the movable member position. Binary data is then placed in shift register 40 by means of the data input terminals. The furthermost stage of the shift register is always placed in "1" state so that when the first shift pulse is applied, winding 41 will be energized, which in turn records a magnetic mark, such as magnetic mark 34 (FIG. 1), which is referred to as a position mark. As will be described hereinafter in greater detail, it is the location of this position mark on the drum which is used in determining the proper location for the movable member during the playback operation.

One or the other of the second and third stages is placed in the "1" state to control the direction of rotation of drive motor 6 during the playback operation. The binary data recorded on the memory drum is not retrieved until after the movable member has reached a desired position during the playback operation, and therefore the binary data is useful in controlling subsequent operations. Accordingly, if it is desired that drive motor 6 rotate in a forward direction to reach the next successive program point, the second stage from the right of shift register 40, designated "F," is placed in the "1" state, or if the reverse direction is desired, the third shift register stage from the right, designated "R," is placed on the "1" state. Binary data stored in the remaining shift register stages can be used to control other desired functions or associated apparatus during the playback operation.

Once the movable member has been positioned, and binary data has been placed in the shift register 40, switch 39 is closed and push button switch 43 is actuated. This places flip-flop circuit 42 in the set state, and thereafter when microswitch 17 is actuated by cam 19, a pulse passes through AND circuit 44 to energize monostable multivibrator circuit 45. The monostable circuit in turn conditions AND circuit 46, which permits the next group of synchronizing pulses to pass through and shift the data from shift register 40, thereby energizing winding 41. It should be noted that the position of the recorded marks along the arcuate path traced by transducer 11 is determined in accordance with the position of the permanently recorded magnetic marks 22. The first of the recorded magnetic marks is the position mark, and the remaining marks are binary data marks corresponding to the playback control instructions.

To record the second program point, the movable member is moved to the next desired location and a new set of binary data is placed in shift register 40. Also, positioning member 16 is moved so that transducer 11 can record in the adjacent recording track. Thereafter, the record push button switch 43 is actuated and a second set of magnetic marks is recorded in the same fashion.

Figure 4:
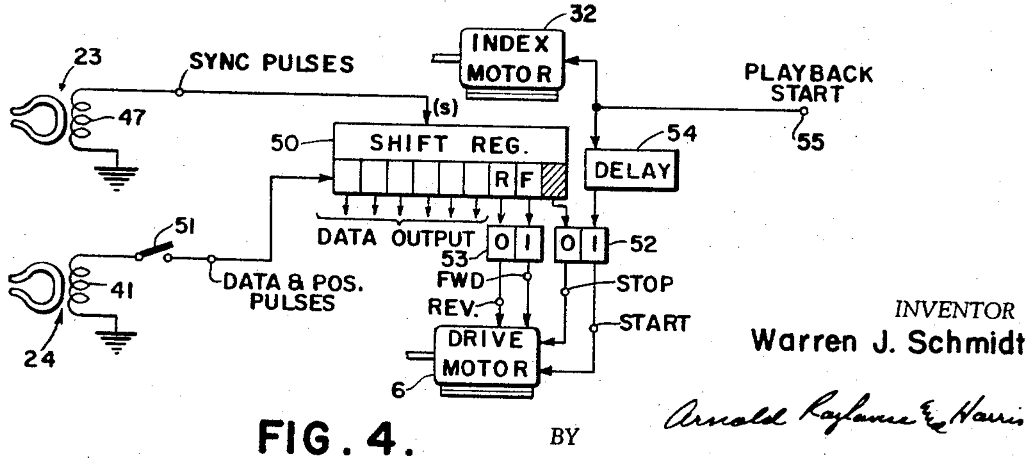
FIG. 4 is a schematic diagram illustrating the playback circuits associated with the memory apparatus illustrated in FIG. 1.

The playback circuits connected to transducers 11 and 23 are shown in FIG. 4 and include a shift register 50 which is essentially the same as shift register 40, previously described in connection with FIG. 3. Winding 47 is connected to the shift input (S) of shift register 50, and winding 41 is connected to the data input of shift register 50 via a switch 51. If the memory drum is located so that transducer 11 passes over a previously recorded set of position and data marks, a pulse train will be provided by winding 41 which is applied to the data input of shift register 50. Winding 47 of transducer 23 provides the necessary synchronizing pulses during the revolution of disc 12 to shift the data into shift register 50. Accordingly, the respective stages of shift register 50 become energized to present the binary data, which previously was in shift register 40 when the marks were recorded, and thus shift register 50 provides temporary storage for the binary data.

The furthermost stage of shift register 50 is connected to the reset input of a flip-flop circuit 52, and the second and third stages are connected to the set and reset inputs, respectively, of a flip-flop circuit 53. The set and reset outputs of flip-flop circuit 53 are connected to drive motor unit 6 so that the motor can rotate in a forward direction when the flip-flop circuit is in the set state, and in the reverse direction when the flip-flop circuit is in the reset state. The set and reset outputs of flip-flop circuit 52 are connected to drive motor unit 6 so that the motor is energized and rotates while flip-flop circuit 52 is in the set state, but does not rotate when the flip-flop circuit is in the reset state. A stage of shift register 50 energizes the corresponding input of a flip-flop circuit when the shift register stage is in the "1" state.

A playback start terminal 55 is connected to the set input of flip-flop circuit 52 via a delay circuit 54, and is directly connected to index motor 32. Thus, when a suitable electrical pulse is applied to terminal 55, index motor 32 is actuated and completes one revolution to move positioning member 16 to an adjacent track. Time delay circuit 54 provides sufficient delay so that the indexing motor 32 can complete one revolution before flip-flop circuit 52 is placed in the set state, thereby energizing drive motor 6.

In the playback operation, the positioning member is placed adjacent the track wherein the first set of position and data marks are recorded. The playback operation is then initiated by applying a suitable pulse to terminal 55 which first actuates the indexing motor to position transducer 11 relative to the first recording track. Thereafter, a pulse is applied, via delay circuit 54, placing flip-flop circuit 52 in the set state and thereby energizing drive motor 6. Flip-flop circuit 53 is initially placed in the appropriate state so that the drive motor rotates in the proper direction to reach the first recorded position mark.

If the movable member is not initially at the desired location, transducer 11 will not initially detect any recorded position or data marks on the memory drum 1. Accordingly, drive motor 6 continues to rotate, moving the movable member toward the desired location until the movable member and the memory drum reach the position previously occupied when the position and data marks were recorded in the first recording track. When this occurs, transducer 11 will provide a pulse train which is shifted into shift register 50. The first pulse of the pulse train will place the furthermost stage of shift register 50 into the "1" state and thereby place flip-flop circuit 52 in the "0" state to de-energize motor 6. Flip-flop circuit 53 is placed in either the set or the reset state, depending on whether the second or third stages of shift register 50 are in the "1" state.

The apparatus thereafter moves toward the second position of the program when a second pulse is applied to terminal 55. This pulse actuates indexing motor 32 to position the transducer relative to the second recording track, and thereafter places flip-flop circuit 52 in the set state, thereby energizing drive motor 6. The motor rotates in the direction indicated by the previous binary data instructions in the second and third shift register stages. The memory drum and movable member will ultimately reach the position which is represented by the second position mark, and when this position is reached drive motor 6 is again de-energized. Operation continues in this fashion until the program is completed.

Another embodiment of the invention, as illustrated in FIG. 5, includes many components previously described in FIG. 1 and therefore like reference numerals are utilized to designate these components. The essential difference is that the mechanism for rotating a single transducer and the shift registers are eliminated by the use of a plurality of magnetic transducers.

A positioning member 60 is supported by a threaded shaft 68, passing through a suitable internally threaded bore in the positioning member, and a slide bar 67, passing through a suitable smooth bore parallel to the internally threaded bore. Slide bar 67 is secured at its ends between end supports 3 and 4 and threaded shaft 68 is journaled in the end supports. Threaded shaft 68 is secured to the shaft of index motor 32. Thus, when shaft 68 is rotated, positioning member 60 is moved in a longitudinal direction with respect to memory drum 1.

Four magnetic transducers 56–59 are secured to one side of positioning member 60 so that the transducers are adjacent one another and aligned parallel to the longitudinal axis of the memory drum. These transducers are of the flux responsive type, such as, for example, Hall effect heads. When energized, these transducers record magnetic marks on the memory surface, but differ from the conventional magnetic transducers in that they provide an output signal when adjacent a magnetic mark even though there is no relative movement between the transducer and the magnetic mark.

The recording circuits as shown in FIG. 5 include three AND circuits 64, 65 and 66, the outputs of which are connected, respectively, to the transducers 57–59. A push button record switch 61 is connected to one input of each of AND circuits 64–66 and to transducer 56. Switch 61 is also connected to a source of positive potential so that the respective AND circuit inputs and transducer 56 are energized when the switch is actuated. The set output of a flip-flop circuit 62 is connected to the other input of AND circuit 64 and the set and reset outputs of a flip-flop circuit 63 are connected, respectively, to the other inputs of AND circuits 65 and 66.

Flip-flop circuit 63 is adapted to control the direction of rotation for the drive motor during the playback operation. If it is desired that the drive motor rotate in the forward direction, flip-flop circuit 63 is placed in the set state, whereas if it is desired that the drive motor rotate in the reverse direction, flip-flop circuit 63 is placed in the reset state. Flip-flop circuit 62, AND circuit 64, and transducer 59 are representative of additional circuits for controlling the recording of additional binary data which provide additional binary control instructions during the playback operation. It should be noted that, when switch 61 is actuated, transducer 56 is energized to record a magnetic mark referred to as the position mark, and that this occurs regardless of the then existing state of flip-flop circuits 62 and 63. Selected ones of transducers 57–59 are also energized when switch 61 is actuated to thus record binary data marks on the memory drum, these binary data marks being in accordance with the then existing state of flip-flop circuits 62 and 63. The position on the drum at which these magnetic marks are recorded depends on the angular position of the memory drum, which in turn is a function of the movable member position.

In recording a program on the memory drum, movable member 7 is first moved to a desired location, thereby angularly positioning the memory drum accordingly. Flip-flop circuits 62 and 63 are placed in the desired state and then record switch 61 is actuated. As a result, a position mark and one or more binary data marks are recorded on the drum surface at an angular position corresponding to the movable member position.

Thereafter, positioning member 60 is moved to an adjacent track, movable member 7 is moved to a new position, and flip-flop circuits 62 and 63 are energized in accordance with a new set of binary instructions. Switch 61 is then actuated and a set of position and data marks are recorded in the second recording track. The recording operation continues in this fashion until the complete program is recorded.

The playback portion of the control apparatus includes a flip-flop circuit 70 connected to drive motor unit 6 so that the motor can rotate in the forward direction when the flip-flop circuit is in the set state, and in the reverse direction when the flip-flop circuit is in the reset state. Also included is a flip-flop circuit 71 connected to drive motor unit 6 so that the drive motor is energized only when flip-flop circuit 71 is in the set state. Transducers 57 and 58 are connected to the set and reset input of flip-flop circuit 70, and transducer 56 is connected to the reset input of flip-flop circuit 71, these connections being via individual contacts of a four-pole switch 73. Transducer 59 is connected to the set input of a flip-flop circuit 72 via the remaining set of contacts of switch 73. A playback start switch 74 is connected between a positive source of potential and indexing motor 32. Switch 74 is also connected to the set input of flip-flop circuit 71 via a time delay circuit 75.

During the playback operation, positioning member 60 is first placed adjacent the recording track in which the first group of magnetic marks is recorded. Thereafter, when playback start switch 74 is actuated, indexing motor 32 is energized and appropriately positions positioning member 60 in accordance with the first recording track. Shortly thereafter, a pulse emerges from delay circuit 75 and places flip-flop circuit 71 in the set state, thereby energizing drive motor 6. Flip-flop circuit 70 is initially placed in a state which causes the drive motor to rotate in the proper direction toward the first recorded group of magnetic marks. Thereafter, when a position mark is detected by transducers 56, flip-flop circuit 71 is placed in the reset state to thereby de-energize drive motor 6. Flip-flop circuit 70 is placed in the set or reset state, depending upon the state of flip-flop circuit 63 when the binary data marks were recorded, and flip-flop circuit 72 is placed in the set state if flip-flop circuit 62 was in the set state when the binary data marks were recorded. Thus, flip-flop circuits 70 and 72 provide temporary storage for the binary data.

Thereafter, movable member 7 is automatically positioned in accordance with the group of magnetic marks in the second recording track by a second actuation of playback switch 74. This first energizes indexing motor 32, which appropriately locates positioning member 60 in accordance with the second recording track. Thereafter, flip-flop circuit 71 is placed in the set state, thereby energizing drive motor 60 which rotates in the appropriate direction toward the second recorded group of magnetic marks. The direction of rotation is determined by the state of flip-flop circuit 70. Operation proceeds in this manner until the program is completed.

In the embodiments illustrated in detail, magnetic recording mediums and associated magnetic transducers are shown. However, it should be obvious that other types of recording mediums and transducers can be employed. For example, the recording medium could be a sheet of thin material adapted so that position and data marks are recorded by perforating the sheet at the appropriate locations; the recording medium could be a sheet of photosensitive material upon which the position and data marks would appear as dark spots; or the recording medium could be a sheet of relatively soft material in which the position and data marks would appear as appropriately located surface depressions. The transducers would be photo optical, card perforaters and the like well known in the art.

It should be obvious that there are numerous other possible variations within the scope of this invention. For example, embodiments could be designed using magnetic memory discs or magnetic memory tapes in place of the magnetic memory drum. Also, the apparatus could be designed so that the transducers are movable with respect to a stationary recording medium as long as the relative position of the transducer with respect to the recording medium is always a function of the movable member position. The invention is more particularly defined in the appended claims.

What is claimed is:

1. In automatic positioning and data storage apparatus, the combination of a movable member;

a magnetic recording medium;

a continuously moving transducer for recording magnetic marks on said recording medium and for detecting previously recorded magnetic marks, said transducer being adapted for continuous movement in an endless path and in a plane parallel to said recording medium;

means for maintaining the position of said transducer with respect to said recording medium as a function of the movable member position;

recording circuit means connected to selectively energize said transducer to record a position mark having a position on said recording medium representative of a movable member position and to record a plurality of binary data marks representative of playback control instructions; and playback means connected to said transducer and operable to position said movable member in accordance with the position and the control instructions represented by previously recorded position and data marks.

2. Apparatus in accordance with claim 1 wherein said playback circuit means includes
driving means for positioning said movable member, said driving means being operably connected to move said movable member until a previously recorded position mark is detected.

3. Apparatus in accordance with claim 1 wherein
said magnetic recording medium is a magnetic drum having an angular position which is always a function of the movable member position and
said transducer is continuously rotating to trace an arcuate path across the circumferential surface of said magnetic drum.

4. Apparatus in accordance with claim 3 wherein said recording circuit means is synchronized in accordance with the transducer position so that said position and data marks are recorded at predetermined locations along said arcuate path.

References Cited

UNITED STATES PATENTS 2,537,770 1/1951 Livingston et al. ---- 340—174.1

OTHER REFERENCES

Hogan, J. W.: "Magnetic Tape Controls Machine Tools," Electronics, December 1954, pp. 144–147.

BERNARD KONICK, *Primary Examiner.*

A. I. NEUSTADT, *Assistant Examiner.*